(Model.)
2 Sheets—Sheet 1.
S. A. MARKER.
HARNESS SADDLE.
No. 278,349.
Patented May 29, 1883.
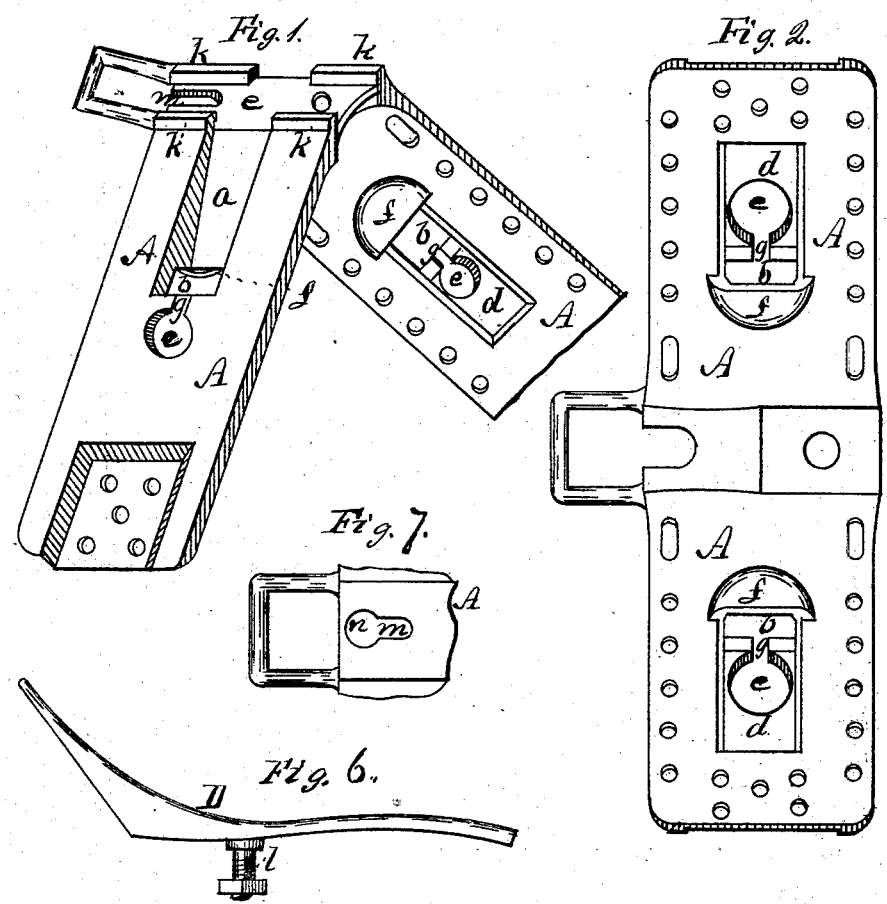
Witnesses
H. A. James
J. B. Lawyer
Inventor
Stephen A. Marker,
By his attorney,
J. S. Brown (Model.)
2 Sheets—Sheet 2.
S. A. MARKER.
HARNESS SADDLE.
No. 278,349.
Patented May 29, 1883.
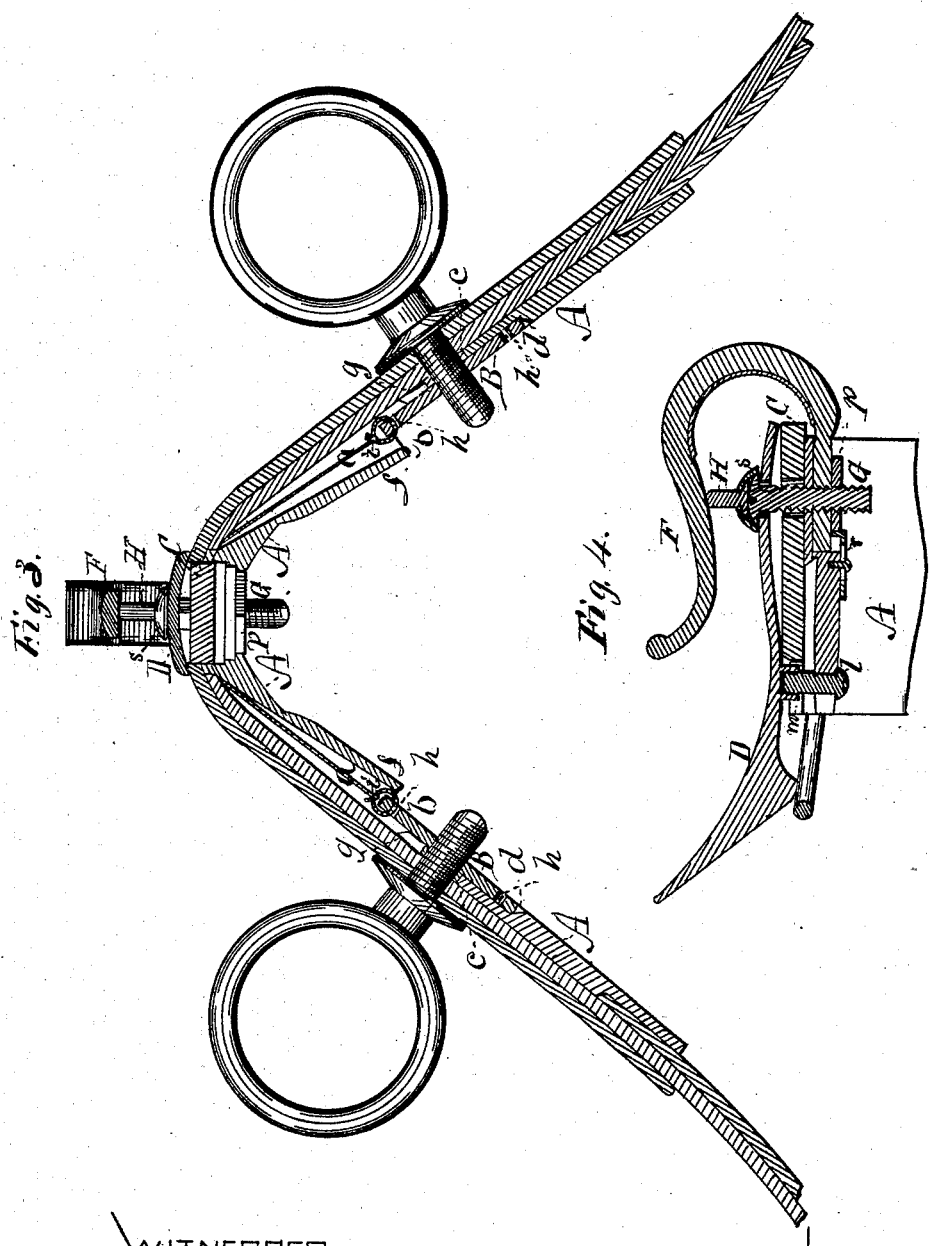
WITNESSES
INVENTOR
Stephen A. Marker,
By his attorney
J. S. Brown.

UNITED STATES PATENT OFFICE.

STEPHEN A. MARKER, OF NEWARK, NEW JERSEY.

HARNESS-SADDLE.

SPECIFICATION forming part of Letters Patent No. 278,349, dated May 29, 1883.

Application filed May 31, 1882. (Model.)

*To all whom it may concern:*

Be it known that I, STEPHEN A. MARKER, of Newark, in the county of Essex and State of New Jersey, have invented certain Improvements in Harness-Saddles; and I do hereby declare that the following is a full and exact description thereof, reference being had to the accompanying drawings, making part of this specification—

Figure 1 being a view in perspective of the improved saddle-tree, showing the construction of the upper side thereof; Fig. 2, a view of the under side of the same; Fig. 3, a central transverse section through the saddle-tree, seat, jockeys, back-band, and skirts; Fig. 4, a central section from front to back; Fig. 5, views of parts detached; Figs. 6 and 7, views showing modifications of the parts.

Like letters designate corresponding parts in all the figures.

The main purpose of my invention is to enable one to readily change the mountings of a saddle after it is finished without taking the saddle apart or disturbing the back-band thereof, it being often desirable to change mountings to suit the tastes of different individuals. For this purpose I form a raceway or channel, $a$, in the upper side of each wing of the tree A, reaching from or from near the center of the tree to an opening, $b$, through the tree a little above the terret-hole $c$, and directing to the nut seat or cavity $d$ in the underside of the tree. This raceway is to admit the terret-nut B from the upper side of the saddle, and to enable it to be pushed down under the back-band directly to its seat, and to enable it to be withdrawn from its seat, when required, by the same way. A depression, $e$, in the top of the tree, at the center part, leads into each raceway, the said central cavity being filled by a removable center piece, C, Figs. 3 and 4, so that on removing the saddle-seat and this center piece access can be had to the upper end of each raceway for the insertion of the nut, or through the raceway to the nut, to withdraw the same; and since this raceway leads from the upper side of the tree to the under side thereof, in order to make the passage for the nut direct and straight, I incline the raceway in the tree, making it gradually deeper therein from top to bottom, so that the nut will be directed through the opening $b$ to the seat or cavity $d$ under the tree without changing direction. This deepening of the raceway at the lower end is provided for by a projection, $f$, on the under side of the tree, whereby the latter is not increased in thickness or weight, and the upper end of the nut, when in place, preferably and very desirably, though not quite necessarily, rests on the upper side of this projection $f$, or in the lower end of the raceway, so that it is always in position to draw out when desired. The opening $b$ through the tree may be quite short to admit this, only sufficient in extent to draw, in casting the tree, when the latter is cast in one piece, and all difficulty in casting may be obviated by casting the tree in two parts and riveting them together, or otherwise uniting the parts. A narrow passage, $g$, is preferably formed between the terret-hole $c$ and the opening $b$, as shown, to enable an awl or any slender instrument to be inserted through the terret-hole and reach the nut at the lower end of the raceway, so as to assist in bringing it down to its seat. The nut B has or may have holes $h\ h$ at the ends of its flanges, by which to hook hold of it for drawing it out of the saddle, or for attaching a string, $i$, Fig. 3, to draw it out by the string remaining in the raceway, and being extended up to the center of the tree, where it can be taken hold of for drawing out the nut after the terret is unscrewed therefrom. I have represented the raceway as formed in the cast tree itself; but it might be formed by casting a slot in the tree, and attaching a bottom piece of metal, leather, or other suitable material to the tree under the same. The center piece, C, Fig. 4, fits in the cavity or depression $e$ of the tree, held in position by flanges or raised projections $k\ k$ on each side of the depression and of the raceways. These flanges serve as firm supports for the seat D, and prevent its sagging. They also enable the tree to be made lighter. They are therefore a desirable though not essential improvement.

Another feature of my invention consists in a screw-stud or adjustable hook projection, $l$, on the under side of the seat D, in combination with a notch or opening, $m$, in the rear edge of the tree or frame. The construction of the projection $l$ may be either as shown in Fig. 4, being composed of a screw screwing up into the seat, or as shown in Fig. 6, being composed of a solid stud with a screw-nut, as a head thereon, or made separately and attached permanently to the seat. In either case the screw head or nut is adjustable to adapt the projection to different thicknesses of leather forming the center piece or filling, C, so as to hold the seat tightly on the saddle, and yet allow the seat to be removed without unscrewing or loosening the stud or projection. The notch $m$ in the rear edge of the tree is for the purpose of receiving the stud or projection $l$ and allowing the same to be withdrawn and re-entered without unscrewing or disturbing the adjustment of the head thereof. Instead of a notch opening entirely out of the tree, a notch or slot opening into a hole or opening, $n$, Fig. 7, large enough to pass the head of the projection through, may be used. With this construction of the seat, and the tree in connection therewith, the seat may be readily removed for withdrawing and re-entering the terret-nuts for changing mountings on the saddle. The seat is held in place, as usual, by the check-hook bolt G of the check-hook F, passed down through the same and through the tree. The nut $p$, which holds the check-hook bolt, is kept from unscrewing in using the saddle by a nut-lock, $r$, as shown in Figs. 4 and 8. It consists of a bent plate bearing against the side of the nut, and it has a longitudinal slot through which a screw passes and attaches the plate to the under side of the tree. By loosening the screw the plate may be moved to or from the nut to lock or unlock it.

What I claim as my invention, and desire to secure by Letters Patent, is—

1. A saddle-tree, A, formed with raceways or channels $a\ a$ in the upper side thereof, extending downward from the top of the tree, with openings $b\ b$ through it at the lower ends of the said raceways, and with seats $d\ d$ in its under side for the terret-nuts, all so constructed that the terret-nuts may be removed at the top of the tree and inserted there without taking the saddle apart or disturbing the back-band, substantially as and for the purpose herein specified.

2. A saddle-tree, A, formed with raceways $a\ a$ in the upper side thereof, extending downward from the top of the tree, and gradually deepening from the upper to the lower ends of the same, with projections $f\ f$ on the under side of the said tree, forming terminations of the said raceways, and having openings $b\ b$ through it, below the said projections, for passing the terret-nuts from their seats $d\ d$ in its under side through it to the said raceways, and out at the top of the saddle, and vice versa, substantially as and for the purpose herein specified.

3. A harness-saddle provided with raceways $a\ a$ in the upper side of the tree, entering from the seat-space, and with flanges or projections $k\ k$ on the tree, at each side of the seat-space and each side of the said raceways, substantially as and for the purpose herein specified.

4. A harness-saddle provided with a stud or projection, $l$, on the under side of the seat D, an adjustable head on the said stud, and a notch or lateral opening, $m$, at the rear edge of the tree, substantially as and for the purpose herein specified.

STEPHEN A. MARKER.

Witnesses:
RENNE J. D. DUNN,
FRANCIS A. SAUNIER.